United States Patent [19]

Betsill

[11] Patent Number: 4,470,046
[45] Date of Patent: Sep. 4, 1984

[54] CAPACITIVELY COUPLED MACHINE TOOL SAFETY SYSTEM HAVING A DIGITAL QUANTIZER

[75] Inventor: Harry E. Betsill, Timonium, Md.

[73] Assignee: E. I. Du Pont de Nemours and Company, Wilmington, Del.

[21] Appl. No.: 345,192

[22] Filed: Feb. 2, 1982

[51] Int. Cl.³ .................. H04Q 9/00; G08B 13/26
[52] U.S. Cl. .................. 340/825.23; 307/328; 307/115; 340/562; 328/5
[58] Field of Search .................. 340/825.72, 562, 680, 340/825.23; 361/179, 181; 328/5, 151; 307/115, 116, 326, 328

[56] References Cited

U.S. PATENT DOCUMENTS

| | | | |
|---|---|---|---|
| 3,573,783 | 4/1971 | Fudaley | 307/328 |
| 3,973,208 | 8/1976 | Diamond | 328/5 |
| 4,004,234 | 1/1977 | Juvinall | 328/5 |
| 4,205,239 | 5/1980 | Arts et al. | 307/328 |
| 4,232,302 | 11/1980 | Jagatich | 328/151 |
| 4,276,539 | 6/1981 | Eshraghian et al. | 328/151 |
| 4,298,841 | 11/1981 | Dishal | 328/117 |
| 4,300,203 | 11/1981 | Brown | 364/577 |
| 4,345,167 | 8/1982 | Calvin | 340/562 |
| 4,370,643 | 1/1983 | Kitamura | 328/151 |
| 4,373,141 | 2/1983 | Sanders | 328/151 |
| 4,378,507 | 3/1983 | Root | 307/326 |

Primary Examiner—Donald J. Yusko

[57] ABSTRACT

A machine tool safety system having a signal induced in a capacitive receptor antenna by the action of an electric field capacitively coupled thereto includes a receiver having an array of linear amplifiers with fast response times, a network connected to the output of each amplifier and responsive to a first command to sample the amplifier output signal, an analog-to-digital converter associated with the sampling network to quantize the signal from the first amplifier in the array that is not saturated, and a network responsive to a second command to dump the sampled signal value prior to the occurrence of the next sample time.

2 Claims, 21 Drawing Figures

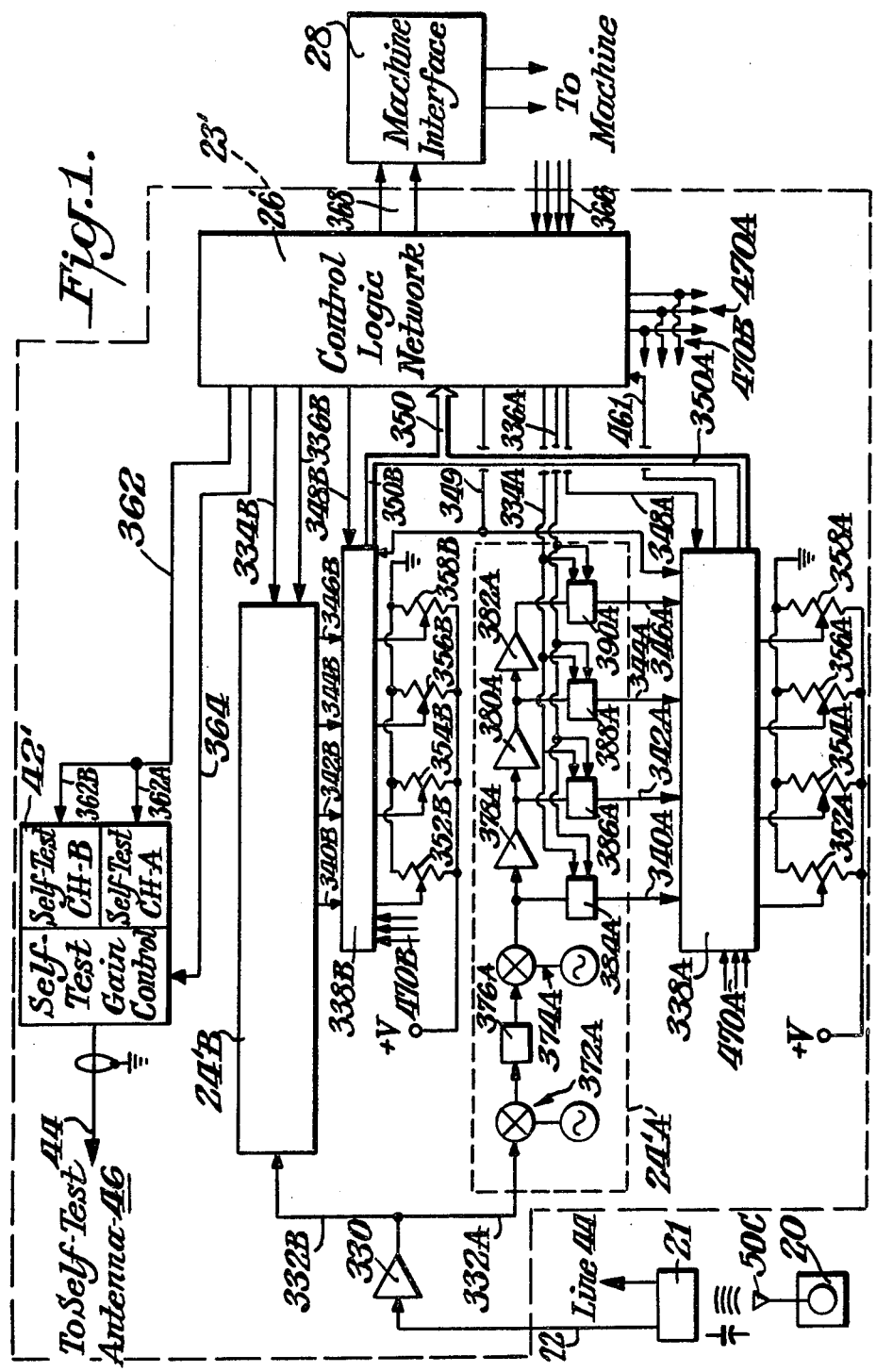

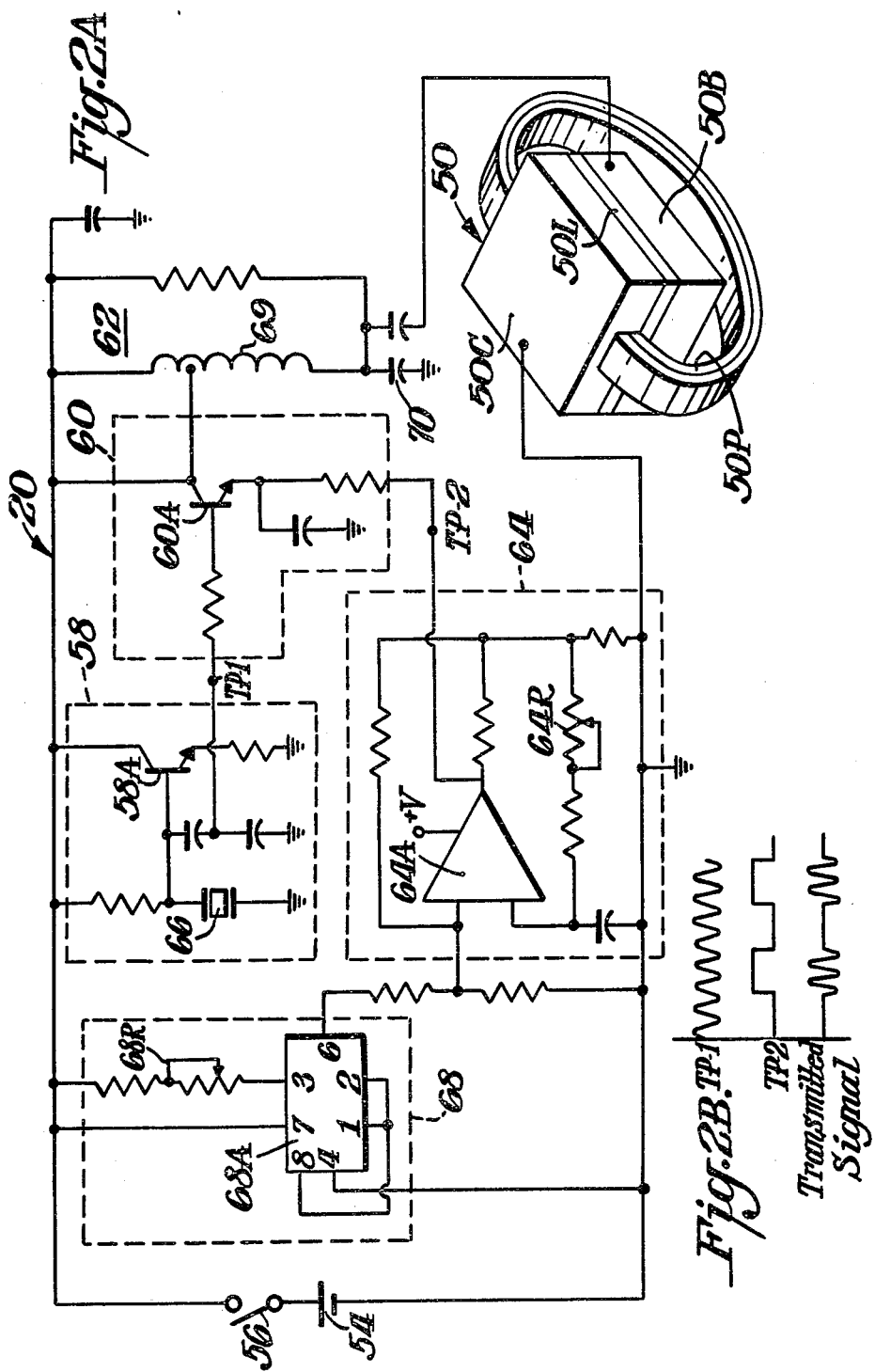

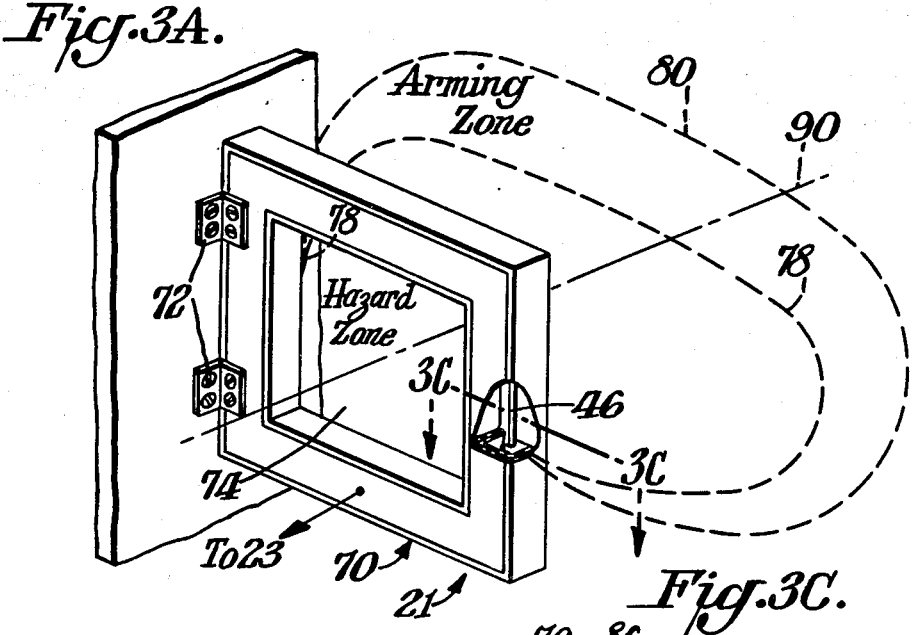
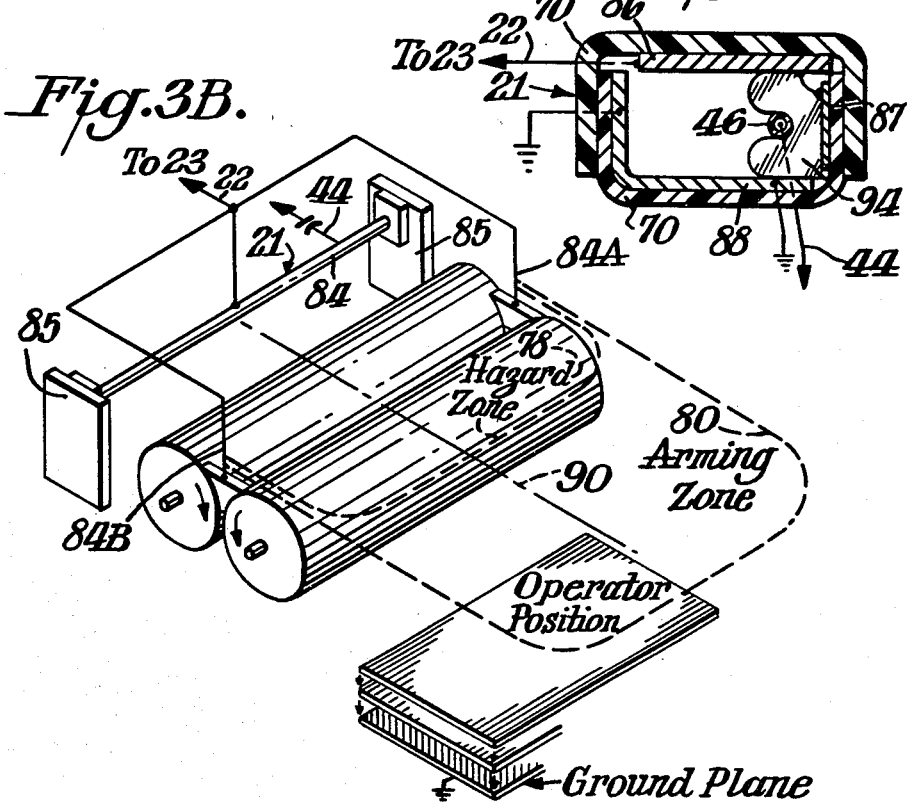

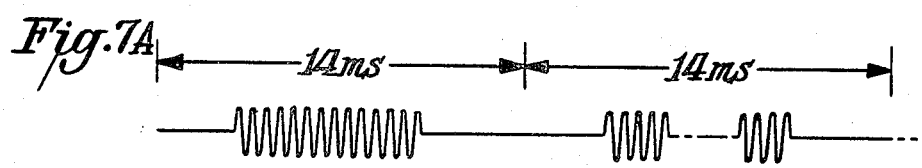
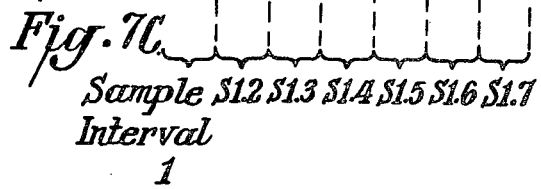
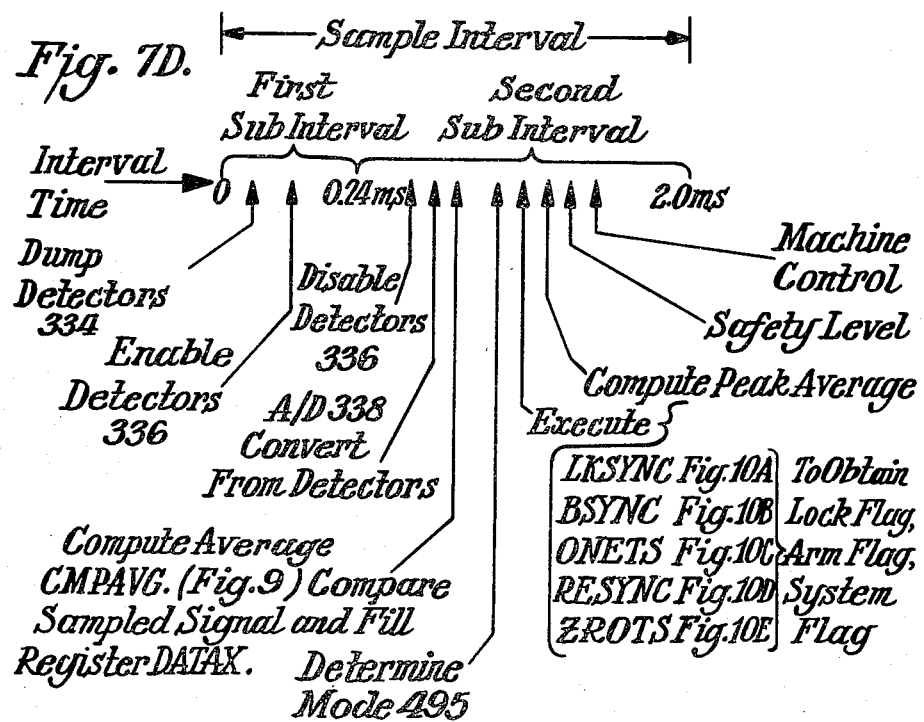

Fig. 7E.

| Sample Interval | DATAX Register MSB 6 5 4 3 2 1 LSB | SYNCX Register MSB 6 5 4 3 2 1 LSB | Sub Routine |
|---|---|---|---|
| 1 | – – – – – – – O | O O O O O O O O | BSYNC |
| 2 | – – – – – – O O | O O O O O O O O | BSYNC |
| 3 | – – – – – O O 1 | 1 O O O O O O O | BSYNC |
| 4 | – – – – O O 1 1 | O O O O O O O 1 | { ONETS, RESYNC |
| 5 | – – – O O 1 1 1 | O O O O O O 1 O | BSYNC |
| 6 | – – O O 1 1 1 O | O O O O O 1 O O | BSYNC |
| 7 | – O O 1 1 1 O O | O O O O 1 O O O | { ZROTS, BSYNC, RESYNC |

— Indicates Don't Care

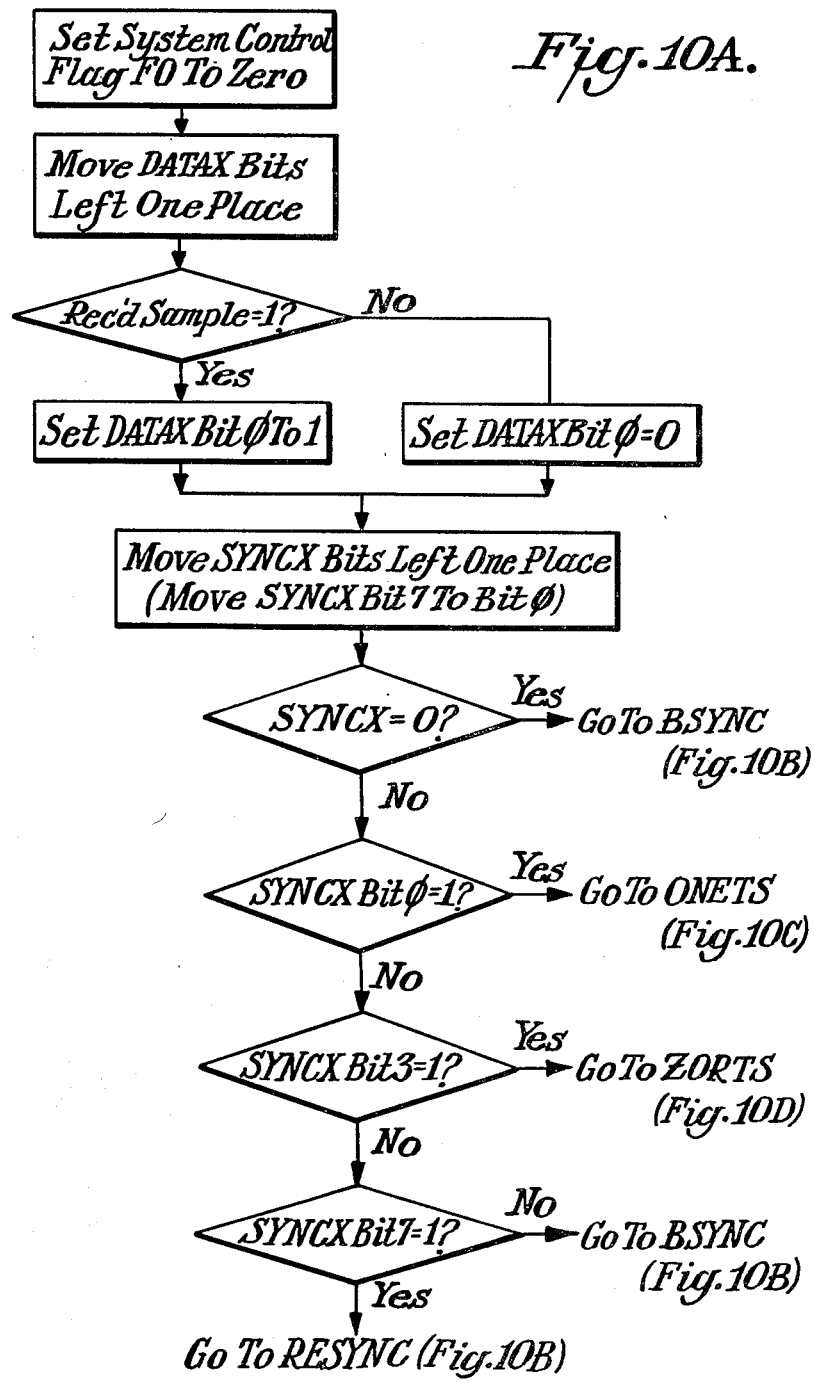

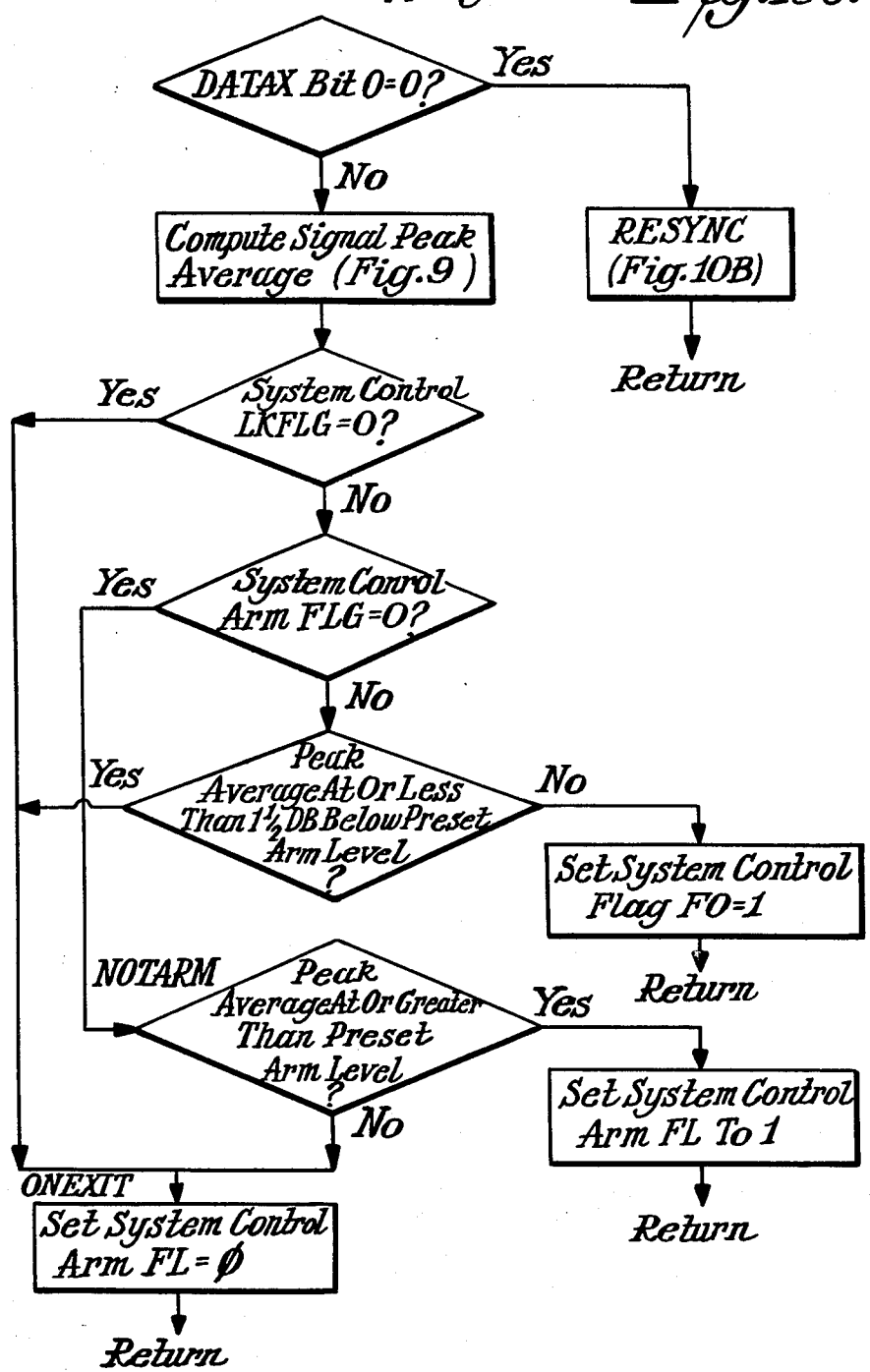

CAPACITIVELY COUPLED MACHINE TOOL SAFETY SYSTEM HAVING A DIGITAL QUANTIZER

CROSS REFERENCE TO RELATED APPLICATIONS

Subject matter disclosed herein is disclosed and claimed in the following applications filed contemporaneously herewith:

Capacitively Coupled Machine Tool Safety System Having A Self-Test Network, filed in the name of W. A. Cook et al. on Feb. 2, 1982, and accorded Ser. No. 345,191; and Capacitively Coupled Machine Tool Safety System, filed in the name of G. R. Hoffman on Feb. 2, 1982 and accorded Ser. No. 345,193.

BACKGROUND OF THE INVENTION

1. Field of the Invention

This invention relates to a safety system which utilizes a capacitively coupled transmission arrangement to provide a uniform pattern in a predetermined sensitivity zone around the machine tool and, in particular, to a safety system which includes a digital quantizer for converting a received analog signal to a digital representation thereof.

2. Description of the Prior Art

Power driven machine tools constitute a primary cause of industrial accidents through crippling or severance of the hands or fingers of the machine tool operator. One attempted solution to this problem is the utilization of mechanical barriers to shield especially dangerous areas on the machine tool and prevent the introduction of any portion of the operator's anatomy into those areas of the tool while still allowing entry of the workpiece. For example, in the case of a pipe flanging tool, a barrier plate having an aperture sized to generally match the outside diameter of a tubular workpiece may be used to prevent the insertion of the operator's fingers or thumb into proximity with the jaws of the flanging machine. To be more fully certain that the operator's hands are protected, it is necessary that the aperture closely match the outside diameter of the workpiece. However, the aperture in the barrier plate must not be so restricted as to prevent the insertion of various sized or odd-shaped workpieces into the machine tool. But if the aperture is sized to receive a wide range of workpiece sizes, the possibility exists that a portion of the operator's body may become engaged by the jaws. It is difficult to find a barrier plate guard arrangement which is flexible enough to permit entry of a variety of workpiece sizes and shapes, yet which simultaneously affords protection to the operator and does not appreciably diminish the throughput of the machine tool.

Other mechanical expedients used in the art include the provision of barrier bars or touch bars which extend across the width of a machine tool. When struck by a portion of the operator's body these elements generate a signal which disables the machine tool. For example, in the case of the power rollers used to work rubber or elastomers, the operator stands on a platform facing two large counterrotating rollers which work the elastomeric material. Safety trip bars at knee level, elbow level and, perhaps even a head level trip wire, extend parallel to the axis of the rollers and interpose themselves between the body of the operator and the rollers. Thus if the operator becomes in any way snagged or drawn into the rotating machinery, the likelihood is that a portion of his body would engage against one of the trip members and would thereby disable the machine tool. However, it is possible that the restraints may be missed or, perhaps more likely, the restraints would terminate the operation of the machine tool only after injury has been inflicted upon the operator.

A number of radio controlled machine tool protection systems are available. Such systems include those described in the following United States Patents: U.S. Pat. No. 4,075,961 (Harris); U.S. Pat. No. 4,057,805 (Dowling, assigned to the assignee of the present invention); U.S. Pat. No. 3,983,483 (Pando); U.S. Pat. No. 3,950,755 (Westbrook, Sr.); U.S. Pat. No. 3,896,425 (Erichsen); U.S. Pat. No. 3,872,455 (Fuller et al.); U.S. Pat. No. 3,409,842 (Embling et al.); and U.S. Pat. No. 1,847,872 (Hand). Each of these devices utilizes some variant of an inductively coupled radio frequency transmitter-receiver arrangement. In such systems the sensitivity pattern of the receiving antenna is dependent upon the orientation of the transmitter on the person of the operator and is also subject to null spaces or voids in coverage. These systems detect and trip if material must be fed into the hazard zone surrounding the machine tool.

It is believed to be advantageous to provide a machine tool safety system which utilizes a capacitively coupled electric field generator (transmitter)-capacitive receptor antenna arrangement to eliminate the existence of null spaces and voids in the sensitivity coverage which exists with an inductively coupled transmitter-receiver arrangement. It is believed to be of further advantage to provide the electric field generator (transmitter) in a form able to be conveniently carried upon some portion of the person of the operator, e.g., the wrist. It is also believed advantageous to provide a safety system the sensitivity of which monotonically increases as the distance between the electric field generator (transmitter) and the capacitive receptor antenna mounted on the machine tool decreases.

SUMMARY OF THE INVENTION

The present invention relates to a machine tool safety system which includes an electric field generator, or transmitter, adapted to generate an electric field and a capacitive receptor antenna mountable to a machine tool, the capacitive receptor antenna and the generator cooperating to define a capacitively coupled transmission arrangement that overcomes the void and null problems associated with inductively coupled transmitter-antenna arrangements and which includes a digital quantizer for converting a received analog signal to a digital representation thereof.

The electric field generator (transmitter) is adapted to be carried on some portion of the person of the operator, such as the wrist and is adapted to generate an electric, or potential field. The electric field generator includes a transmitting antenna the field of which can be shaped to overcome body shielding. The electric field generator uses the body of the operator upon whom it is carried as part of an electric field radiator.

The capacitive receptor antenna is mountable to the machine tool or in a predetermined location with respect to the machine tool and is cooperable with the electric field generator to form a capacitively coupled transmission arrangement able to induce, by the action of the electric field through the capacitive coupling, a monotonically increasing electrical signal, the magnitude of which is functionally related to the distance between the electric field generator and the capacitive receptor antenna. The capacitive receptor antenna includes a conductive member configured in a predetermined manner to define a predetermined corresponding sensitivity zone which may generally be provided in a predetermined shape.

A signal processor is connected to the capacitive receptor antenna and is responsive to the signal induced in the antenna to generate a first, and/or a second indicator when the magnitude of the induced signal exceeds a first, and/or a second predetermined threshold, respectively. Any predetermined number of indicators may be generated. The indicators may be used to form the basis for decisions aimed at safe operation of the machine tool.

In the preferred embodiment of the invention the signal processor develops a representation of the magnitude of the electrical signal induced in the capacitive receptor antenna for comparison with the predetermined thresholds. It is also desirable in the preferred embodiment that the field produced by the electric field generator (transmitter) varies in accordance with a predetermined radio frequency carrier and is, in addition, modulated in accordance with a predetermined modulation characteristic. The field may exhibit a predetermined recurrence rate and duty cycle. The use of a carrier frequency permits selective high amplification of the induced signal and rejection of local changes in the electric field originating from extraneous sources. The modulation characteristic applied to the carrier frequency provides discrimination against the possibility of interference from other transmitters operating at the same carrier frequency (e.g., a local radio station). The signal processor also comprises a network for amplifying the carrier frequency and detecting the modulation characteristic of the induced signal to verify that the signal is induced in the capacitive receptor antenna by the action of the electric field from the electric field generator (transmitter).

The digital quantizer includes a network responsive to a first command (ENABLE) for asynchronously sampling the induced signal a predetermined number of sample times during each period of the induced signal, an analog-to-digital converter connected to the sampling network for quantizing the magnitude of the sampled signal at each sample time, and a network responsive to a second command, (DUMP) to remove the sampled signal from the sampling network prior to the occurrence of the next sample time.

BRIEF DESCRIPTION OF THE DRAWINGS

The invention will be more fully understood from the following detailed description thereof taken in connection with the accompanying drawings which form a part of this application and in which:

FIG. 1 is a generalized block diagram of the machine tool safety system using a capacitively coupled electric field generator-capacitive receptor antenna arrangement;

FIG. 2A is a detailed schematic diagram of an electric field generator (transmitter) used in the present invention and FIG. 2B indicates the waveforms of signals present at predetermined locations in FIG. 2A; electric field generator useful in connection with a discrete logic implementation of a signal processor;

FIGS. 3A and 3B are, respectively, isolated perspective views of two specific configurations of a capacitive receptor antenna of the the present invention for use with a pipe flanging apparatus and an elastomer rolling apparatus, respectively, while FIG. 3C is a sectional view taken along section lines 3C—3C in FIG. 3A;

FIGS. 7A through 7E are timing diagrams and register sequence diagrams illustrating the operation of the microcomputer-controlled signal processor.

DETAILED DESCRIPTION OF THE INVENTION

Figure 4:
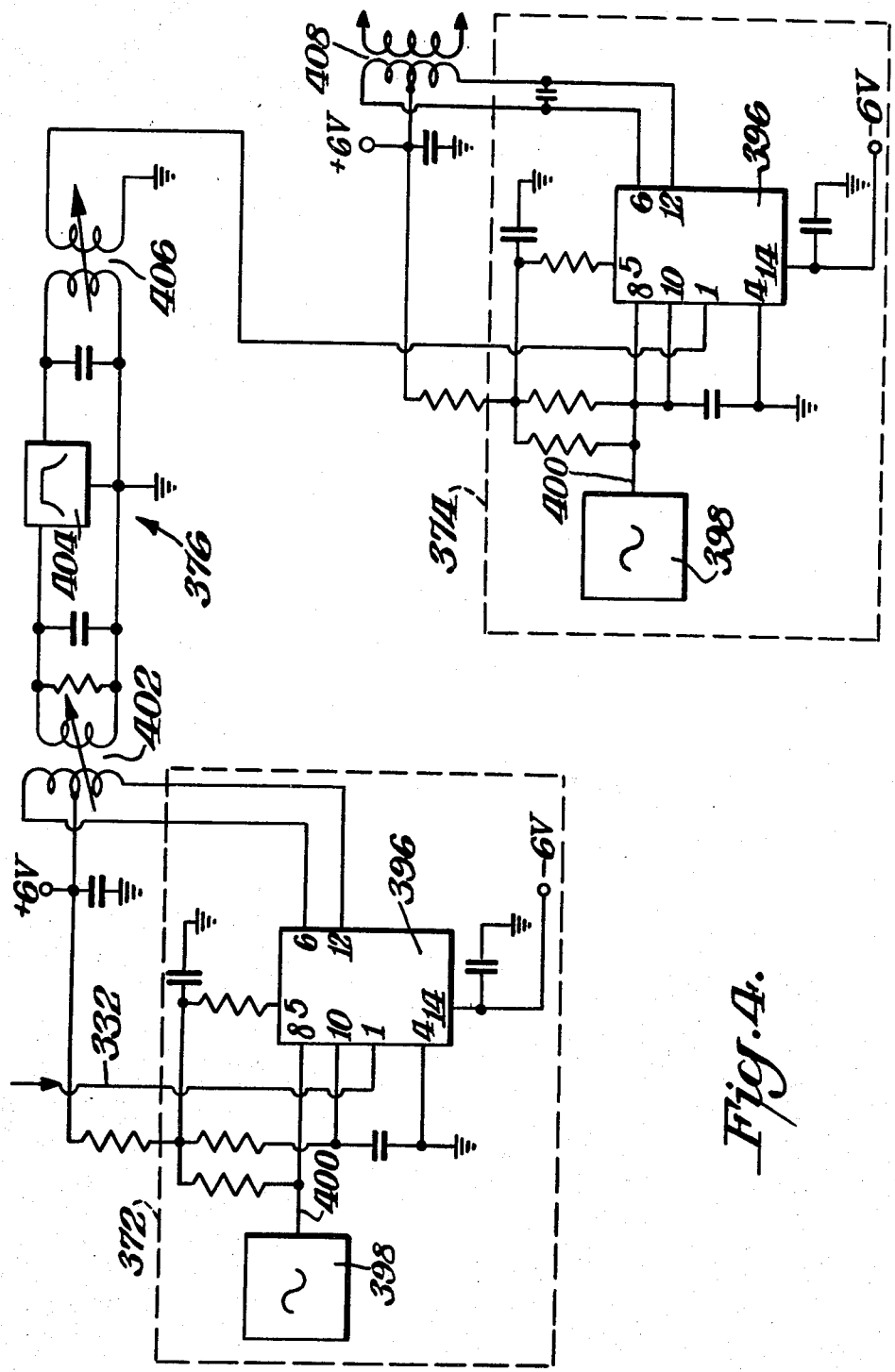
FIG. 4 is a schematic diagram of the oscillator-mixer and filter stages used in the receiver of the embodiment of the present invention having a microcomputer controlled signal processor.

Throughout the following detailed description similar reference numerals refer to similar elements in all figures of the drawings.

FIG. 1 is a generalized functional block diagram of a machine tool safety system 19 in accordance with the present invention which utilizes a microcomputer controlled implementation of the signal processor (two channel receiver).

The machine tool safety system 19 includes an electric field generator, or transmitter, indicated by reference character 20, a capacitive receptor antenna 21 and a signal processor 23. The signal processor 23 itself includes a receiver 24, and a control logic network 26. The signal processor 23 is connected to a machine tool control interface 28 which interacts with the signal processor 23, the machine tool and the operator. The interface may include a power relay network which controls the application of electric power to the machine tool. The transmitter 20 and the capacitive receptor antenna 21 cooperate to define a capacitively coupled transmission system.

The electric field generator 20 is preferably adapted to be carried on a portion of the person of the machine tool operator, as for example the wrist. One or more electric field generators may be used to define multichannel operation each electric field generator being worn in a different location on the person of the operator depending upon the situation and the perceived safety risk. For example, when used with a pipe flanging apparatus where only one of the operator's hands is likely to be exposed to the risk of entry into a hazard zone, it may be sufficient to utilize a single wrist transmitter operating in one frequency channel. In an elastomer rolling mill where either arm may potentially enter a hazard zone, it may be desirable to utilize a dual frequency channel arrangement wherein a transmitter is provided on each wrist of the operator. Extension to Q frequency channels of operation and to R operators, of course, lies within the contemplation of the present invention. As is discussed herein, in the preferred embodiment of the invention the electric field produced by the electric field generator 20 is varied in accordance with a predetermined carrier frequency and is also modulated in accordance with a predetermined modulation characteristic.

The capacitive receptor antenna 21 is mountable in any predetermined location with respect to the machine tool. By the term "capacitive receptor antenna" it is meant a device which is sensitive to the electric field produced by the electric field generator 20 and responsive thereto to produce an electrical signal output, the "induced signal." The capacitive antenna 21 is a device adapted to capacitively couple a conductor (antenna) disposed as part of the electric field generator 20 with a conductive member provided within the capacitive receptor antenna 21. The capacitive receptor antenna 21 is configured to exhibit a predetermined sensitivity pattern that covers a predetermined hazard zone about the machine tool, as discussed in connection with the specific examples shown in FIG. 3. The capacitive receptor antenna 21 responds to the electric field generated by the electric field generator 20 by producing an induced signal on an output line 22 that monotonically increases as the distance between the electric field generator 20 and the capacitive antenna 21 decreases. In this manner the voids and nulls associated with electromagnetic and magnetic coupling techniques used in various prior art safety devices are eliminated. Judicious selection of the configuration of the conductive member in view of the machine tool's configuration and with appropriate conductive shielding provides the capability of forming unique sensitivity patterns which may be desirable when protecting various machine tools.

The signal processor 23 is connected to the capacitive receptor antenna 21 and responds to the induced signal on the line 22 to generate one or any predetermined number of indicators which may be used to form the basis of decisions aimed at the safe operation of the machine tool. The indicators are generated by comparison of the magnitude of the induced signal with each of an appropriate predetermined number of thresholds.

In the microcomputer controlled implementation of the signal processor each channel of the receiver 24 responds to the induced signal to translate it to an IF frequency, develops four successive estimations of the induced signal level, and peak detects in a sample-and-hold manner under the control of a microcomputer 460 (FIGS. 1 and 6) in the control logic 26. The four successive estimations are applied to an analog-to-digital converter and read by the microcomputer to generate one binary numerical representation in log format of the induced signal at the sample time. Thresholds are established by potentiometers 352 and 354 which can be accessed by the microcomputer and used to develop the indicators herein discussed. When the electric field is varied in accordance with the radio frequency carrier and modulated in accordance with the predetermined modulation characteristic, an exponentially averaged representation of the signal is developed by computer algorithm. The virtue of the microcomputer control permits ease of adaption of the signal processor 23 to generate indicators needed to meet the safety requirements of a specific machine tool. A listing of the program for the microcomputer is provided in the Appendix attached hereto and hereby made part of this application.

ELECTRIC FIELD GENERATOR

FIG. 2A is a detailed schematic diagram of the electric field generator 20 used in connection with the microcomputer controlled signal processor. FIG. 2C is a schematic diagram of an electric field generator which may be used in connection with the discrete logic implementation of the signal processor.

The electric field generator 20 is a battery operated crystal controlled device preferably sized to be mounted within a conductive, metallic casing 50 fabricated from e.g., stainless steel or aluminum. The casing 50 is about the size of a wrist watch. The watch size is believed most convenient for carrying by a machine operator on the wrist. Of course the electric field generator 20 may be modified for carrying about any predetermined portion of the anatomy of the operator.

The crystal controlled oscillator contained within the electric field generator 20 must be referenced to ground on one terminal in order to establish the electrical field produced thereby. Accordingly, a capacitive or ohmic contact between a portion of the casing and the body of the person is required. The cover and metal band 50C of the casing 50 is insulated from the bottom 50B by a layer of insulating material 50L. The bottom 50B of the casing 50 is in contact with the skin of the operator. The band is suspended above the skin of the operator by an insulating pad 50P such that a potential field is established between the skin of the operator and the band. This provides nearly isotropic coverage with minimum shielding effects.

Alternatively, the electric field generator 20 may comprise two concentric bands separated by an insulator such that both bands are driven in opposition. The entire assembly is suitably insulated on all surfaces to prevent body contact with the operator and to protect the electric field generator from the environment.

In some instances, as in the elastomer rolling environment shown in FIG. 3B, it may also be desirable that the operator occupy a position on a ground plane so that the body of the operator is capacitively coupled to ground to further stabilize the strength of the field produced by the electric field generator 20. It should be noted that in those instances where the operator is manipulating large metallic workpieces, as in conjunction with a pipe flanging machine, the radiated field from the electric field generator 20 increases when the metallic workpiece is grasped before the workpiece contacts the machine. Since this occurrence has a tendency to increase the induced signal, it is viewed as a substantially failsafe condition.

Each battery powered electric field generator is preferably configured to emit a unique modulated signal at a frequency sufficiently low to provide essentially isotropic coverage of the hazard zone and the arming zone (FIG. 3) of the capacitive receptor antenna. If a second electric field generator is utilized, the second transmitter emits a second similarly modulated signal at a different carrier frequency spaced from the first carrier frequency to a duplicate second receiver which may be connected to the same or a different capacitive receptor antenna. The signal from the second transmitter may be modulated at the same or a different modulation characteristic.

With reference to FIG. 2A, the detailed schematic diagram of the electric field generator 20 used in the operator safety system of the present invention having the microcomputer controlled implementation of the signal processor is shown. The transmitter 20 is operated by a single cell mercury battery 54 of the hearing aid type. The battery 54 is preferably that manufactured and sold by Everready Inc. under model number EP6-75E6. The transmitter is operated upon closure of a switch 56 by the machine operator. The switch 56 is conveniently mounted on a suitable location in the casing 50. The expected lifetime of the battery 54 is approximately one hundred hours at which time the voltage output drops from the nominal fresh value of 1.35 V to 1.2 V.

As seen in FIG. 2A the electric field generator 20 includes a radio frequency oscillator network 58, a radio frequency amplifier modulator network 60, an output parallel resonant network 62 (69,70), a modulating network 64 and a battery monitor network 68. The radio frequency oscillations are generated by the transistor 58A in combination with a crystal 66 and associated components. Suitable for use as the transistors 58A and 60A are devices manufactured by Motorola and sold under model number 2N2222A.

The output coil 69 and shunt capacitor 70 steps up the output voltage. In practice, about six volts peak-to-peak is available at the output. The radio frequency carrier preferably lies in the range from 1.5 to 1.9 MHz. This signal is present at the test point TP-1 as illustrated in FIG. 2B. Depending upon the carrier frequency, the magnitude of the capacitor 70 is either 300 pF. (for 1.5 to 1.7 MHz operation) or 220 pF. (for 1.7 to 1.9 MHz operation).

The RF carrier is switched on and off by the modulating network 64. An operational amplifier 64A such as that sold by National Semiconductor under model number LM10 is used to produce a square wave voltage reference. The recurrence rate is about seventy Hertz, although any predetermined recurrence rate may be used. Proper setting for the modulator 64 is established by a potentiometer 64R which is adjustable to provide a square wave signal of a predetermined duty cycle (preferably fifty percent) to the amplifier 60. Of course, any suitable duty cycle may be employed. This waveform, derived from test point TP-2, is illustrated in FIG. 2B. The carrier signal, modulated in accordance with the modulation characteristic imparted by the modulator 64, produces an output waveform radiated from the antenna 50C of the form shown in FIG. 2B.

Monitoring of the battery voltage is accomplished by a battery monitor network 68 preferably formed of an operational amplifier 68A such as that sold by National Semiconductor under model number LM10. The amplifier 68A contains an accurate internal voltage reference (pin 1) and a general purpose amplifying stage (pins 2, 3 and 6). The output reference (pin 1) is compared with the battery voltage applied at pin 3 through a potentiometer 68R. The potentiometer 68R is adjusted for modulation cutoff upon the battery voltage dropping below 1.2 V. When the battery voltage falls below this level (1.2 V) the output (pin 6) of the amplifying stage switches states to cut off the modulator 64. Thus, the electric field generator outputs a continuous unmodulated RF carrier signal (as shown at TP-1 in FIG. 2B). As will be discussed herein the signal processor 26 is arranged to reject a continuous (unmodulated) RF carrier signal and an indicator signal is unable to be generated. In addition, continuous transmission of the unmodulated RF carrier signal increases the drain on the battery. This occurrence is advantageous in that it minimizes the possibility of short term battery recovery by temporarily turning off the generator.

As an alternative, a crowbar network may be used to monitor the battery voltage. As long as the battery supply remains greater than a reference voltage applied to an operational amplifier in the crowbar network the output of the amplifier is not asserted. However, as soon as the battery supply drops below the reference, the amplifier changes state to close a switch which effectively shunts the battery to ground potential.

The rf voltage applied to the cover and conductive band relative to the body of the operator generates an essentially isotropic electric field. This is due to the fact that the near field conditions of electromagnetism apply. The electric field lines terminate uniformly at the surface of the conductive member disposed in the capacitive receptor antenna regardless of the orientation of the electric field generator. Consequently, the generation of nulls, voids or dead spaces in the sensitivity pattern of the capacitive receptor antenna 21 is avoided. It may be desirable to include in the generator a network to monitor the electric field strength to insure that the field's strength remains above a predetermined level.

It should be noted that when several electric field generators are operating simultaneously each transmits on a different crystal frequency. Therefore, an arming indicator may be generated for each generator used in the particular safety system. Of course, should the circuitry which generates an arming indicator not be utilized in a particular application the modulation of the field is superfluous. It is desirable that the field be varied at a sufficiently low carrier frequency such that the entire safety system may operate in the near field and that the capacitive coupling action between the field generator and the capacitive receptor antenna be almost entirely the result of capacitive coupling between the electric field generator and the capacitive receptor antenna.

THE CAPACITIVE RECEPTOR ANTENNA

FIGS. 3A and 3B are isolated perspective views of two of the possible configurations of a capacitive receptor antenna used in connection with the operator safety system of the present invention.

The capacitive receptor antenna shown in FIG. 3A is adapted for use with a safety system arranged for the protection of an operator's hand while using a pipe flanging tool. The capacitive receptor antenna shown in FIG. 3B is adapted for use in connection with an elastomeric roll mill. Of course, the capacitive receptor antenna 21 may be arranged in any suitable configuration compatible with the environment in which the safety system 19 is used.

As seen in FIG. 3A the capacitive receptor antenna 21 is disposed within a substantially rectangular, nonconductive frame 70 that is conveniently mounted, as by pivots or hinges 72, adjacent to the face of a power tool. For example, the frame 70 is preferably pivotally mountable to the tool itself such that the machine tool forms part of the shielding structure. An aperture 74 is defined through which elongated objects may be inserted into the jaws of the tool. No portion of the machine tool should protrude through the aperture. The capacitive receptor antenna 21 has a sensitivity which defines a hazard zone extending a predetermined close distance about the region forward of the frame 70. The boundary of the hazard zone is indicated by the dashed lines 78 in FIG. 3A. Entry of the portion of the person of the operator having the transmitter 20 (FIG. 2) thereon into the hazard zone 78 causes the SAFETY LEVEL signal (on the line 30) to exceed the threshold and results in the generation of the first indicator signal. If desired, any predetermined number of zones may be defined.

Further removed from the hazard zone is a similarly shaped arming zone defined about the capacitive receptor antenna 21 by the dashed lines 80. Entry of the operator having the transmitter 20 thereon into the arming zone 80 results in the generation of the ARM signal on the line 36 which, if it exceeds the threshold level, generates the second indicator. The distances of the outer boundaries of the zones 78 and 80 are controlled by the threshold settings in the signal processor. FIG. 3C is a side elevational view taken along section lines 3C—3C in FIG. 3A illustrating the structure of the capacitive receptor antenna 21. The capacitive receptor antenna 21 is formed of a conductive member 86 electrically connected to a second conductive member 87. The members 86 and 87 are formed of copper tape. A substantially L-shaped aluminum electrostatic ground shield 88 is provided behind the conductive member 86 plate. The shield 88 enhances sensitivity along the axis 90 of the antenna and minimizes the effects of electrical noise originating from points behind the shield 88. The members 86, 87 and the ground shield 88 are disposed in a suitable nonconductive casing 70 such as vacuum-formed (extruded nonconductive) ABS plastic to provide mechanical protection. The self-test antenna 46 is an insulated wire loop supported in its position between the conductive members 86 and 87 and the electrostatic shield 88. The self-test antenna 46 is supported by a thermoplastic holder 94.

In the environment of a rubber rolling mill the capacitive receptor antenna 21 (FIG. 3B) takes the form of an elongated conductive tubular member 84 mounted between end plates 85. The tubular member 84 extends substantially parallel to the axis of the rolls at a location just above the top and just past the roll farthest from the operator. In practice it may be necessary to utilize compensating supplementary stub antennas 84A and 84B disposed forwardly above the ends of the tubular member 84. The stub antennas are electrically connected to the tubular member. Again a hazard zone 78 is defined a predetermined distance forward of the capacitive receptor antenna and an arming zone 80 further removed therefrom. It should be noted that although the details of the machine tool are not shown in FIG. 3B, the structure of the machine tool is needed to produce the patterns as shown in that Figure.

MICROCOMPUTER CONTROLLED RECEIVER AND SIGNAL PROCESSOR

The microcomputer-controlled receiver 24 used in connection with the control logic network 26 contains an array of amplifier stages and peak detectors which are sampled under the control of the microcomputer. In this manner the microcomputer-controlled signal processor 23 measures the magnitude of the sampled signal peaks at each amplification stage and selectively converts the results into decibel form for comparison with predetermined and calibrated threshold levels to generate machine control indicators.

With reference to FIG. 1 the induced signal is carried to the high impedance input of a common radio frequency amplifier 330. The amplifier 330 is configured to provide approximately ten decibels of gain. The output of the amplifier 330 is carried over lines 332 each leading to a receiver 24, with one receiver 24 being provided for each of the wrist transmitters utilized in the particular implementation of the invention.

Although shown in FIG. 1 are two receiver channels 24A and 24B, it is to be understood that any predetermined number of receivers, corresponding to the number of electric field generators utilized in the particular implementation of the machine tool safety system are deployed. In the description that follows herein only the receiver 24A and associated elements for one channel of operation (corresponding to one electric field generator) are described. However, the circuit configuration and operation for other receiver channels (if provided) are identical. (In the program listing appended hereto and made part hereof, the two channels A and B are referred to as channels 0 and 1, respectively. In the discussion of the program which follows, the suffix "X" following a register label indicates that the register is associated with the channel of interest.)

Each receiver 24 is operatively associated with the microcomputer 460 (FIG. 12) disposed within the control logic network 26 by control lines 334 and 336. In addition, each receiver 24 is operatively connected to a multiplexing analog-to-digital converter 338 by lines 340, 342, 344 and 346. Suitable for use as the converter 338 is a device sold by National Semiconductor Corporation under model number ADC0809CCN. The converter 338 is connected to the microcomputer for its synchronization and timing over a set of control lines which are collectively indicated by the reference characters 348 and 349. In addition, the eight-bit data from the converter 338 flows unidirectionally over a bus 350 to the microcomputer 460, when addressed over lines 470, and transmitting a convert complete signal on a line 461. The converter 338 is also connected to an array of potentiometers 352 (ARM), 354 (SAFETY LEVEL), 356 (SELF-TEST HIGH) and 358 (SELF-TEST LOW).

The control logic network 26 receives machine tool status signals and service requests over an array of conductors 366. Control indicators, such as MACHINE ENABLE and MACHINE OVERRIDE are output from the control logic network 26 to the machine interface 28 over an array of output lines 368.

Each receiver 24 includes a first mixing stage 372 and a second mixing stage 374 coupled through a filter network 376. The output of the second mixing stage 374 is serially applied through an array of amplifiers 378, 380 and 382, respectively. The output of the second mixer 374 and each amplifier stage 378, 380 and 382 is connected to a peak detector 384, 386, 388 and 390, respectively. The peak detectors are respectively coupled to the converter 338 over the lines 340, 342, 344 and 346.

FIG. 4 is a detailed schematic diagram of the first and second mixing stages 372 and 374, respectively and of the filter network 376. Each of the mixing stages includes a mixer element 396 such as that manufactured by National Semiconductor and sold under model number LM-1496N. A crystal controlled local oscillator 398 is connected by a line 400 to the mixing element in each of the stages. The stages 372 and 374 operate in sequence to translate to a first intermediate frequency of 10.7 megahertz down to one hundred kilohertz. Both stages use high side injection. The filter network 376 is a 10.7 megahertz crystal filter primarily used to reject the adjacent channel. The output of the second stage mixer 374 is coupled by a tuned transformer 408 to the first amplifier stage 378 (FIG. 5).

Figure 5:
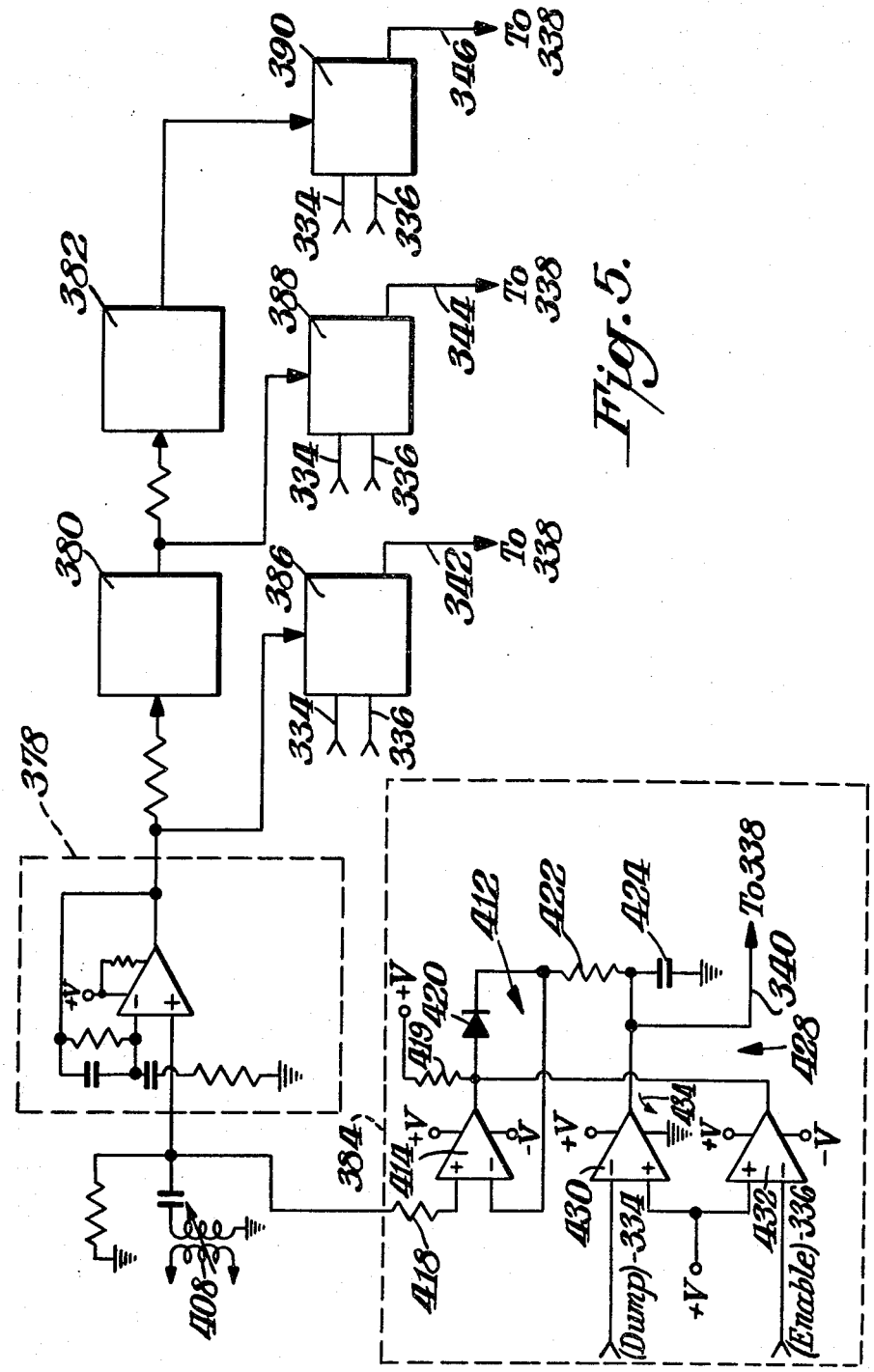
FIG. 5 is a schematic diagram of one stage of the I.F. amplifier and peak detector network used in the receiver of the embodiment of the present invention having a microcomputer controlled signal processor.

As shown in FIG. 5 each amplifying stage 378, 380 and 382 is an intermediate frequency amplifier designed to pass the one hundred kilohertz signal output from the second mixer stage 374. Suitable for use within each amplifying stage is a current mode saturating type operational amplifer such as that manufactured by RCA under model number CA3080. This operational amplifier is selected because it provides excellent linearity and (fast) recovery characteristics well into its saturation limit. Each IF amplification stage is configured to give 19.5 decibels of gain. The last operational amplifier (in the amplification stage 382) will saturate first as signal strength progressively increases and each of the preceding amplifier circuits saturates progressively toward the front end of the receiver.

FIG. 5 also shows a detailed schematic diagram of the peak detector circuit 384. Each of the other peak detector sample and hold circuits 386, 388 and 390 are identical to the detector 384. Peak detector 384 includes a peak-detect sample and hold network generally indicated by reference character 412 and a comparator arrangement generally indicated by reference character 428.

The sample and hold network 412 includes a comparator 414 such as that manufactured by National Semiconductor under model number LM339. The input of the comparator 414 is connected to the output terminal of the coupling transformer 408 or the preceding IF stage through a current limiting resistor 418. The output of the comparator 414 is connected through a diode 420 and a resistor 422 to a capacitor 424.

Figure 6:
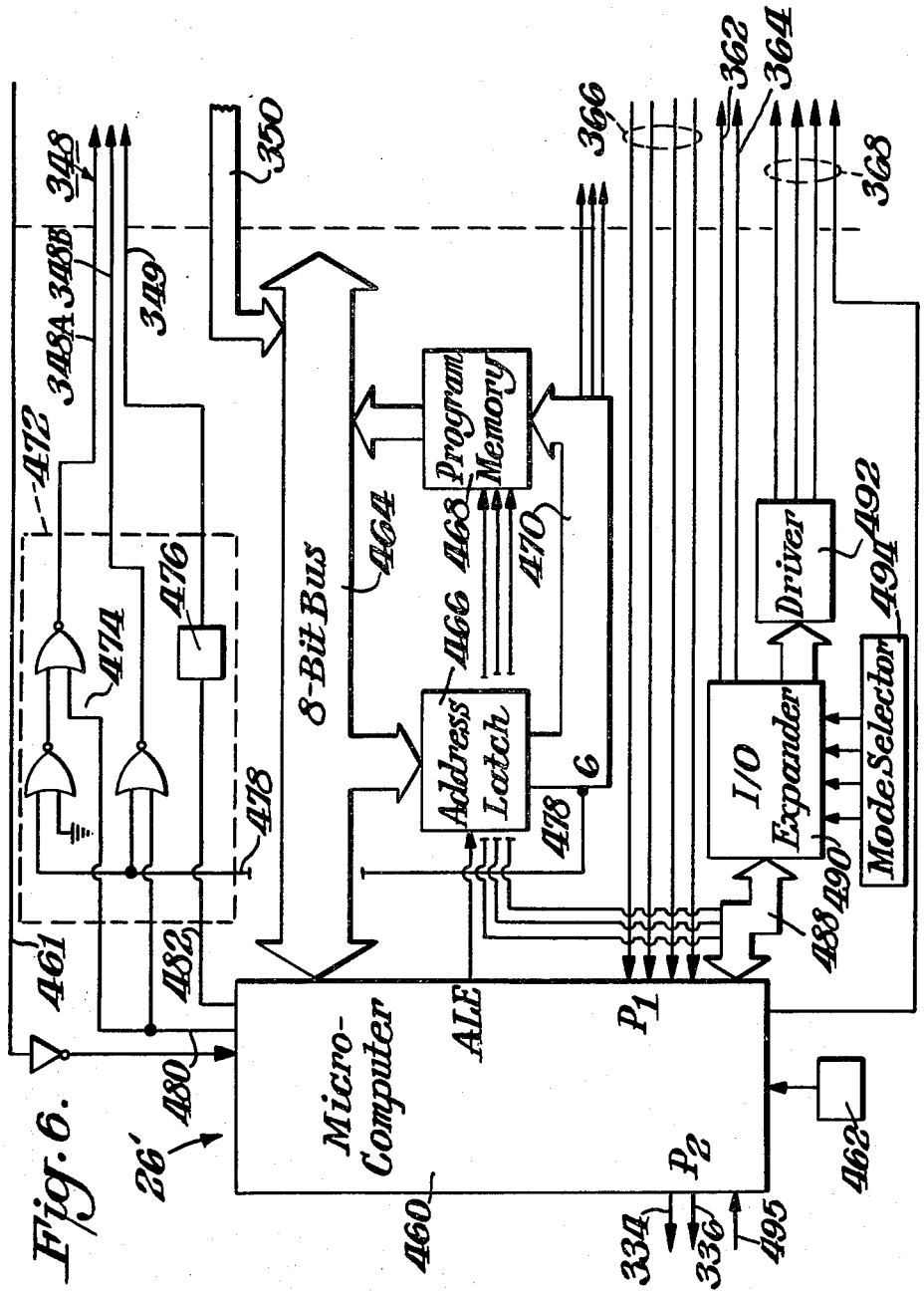
FIG. 6 is a block diagram of the microcomputer used to control the signal processor of the present invention shown.

The comparator network 428 includes first and second comparators 430 and 432, respectively. The noninverting inputs of each of the comparators 430 and 432 are connected to a positive biasing voltage. The inverting terminal of the amplifier 430 is connected over the control line 334 (DUMP) to the microcomputer (FIG. 6). The inverting terminal of the comparator 432 is connected over the control line 336 ENABLE output from the microcomputer. The output of the comparator 430 is connected to the capacitor 424 and over the line 340 to the analog-to-digital converter 338. Similarly, the output signals from the peak detectors 386, 388 and 390, respectively pass over lines 342, 344 and 346 to the converter 338.

As is discussed herein in connection with the operation of the microcomputer controlled receiver and control logic network, before a voltage to be measured is impressed across the capacitor 424 the microcomputer generates a ten microsecond DUMP signal applied on the line 334 to allow the charge resident on a capacitor 424 to drain to ground via the comparator 430, as indicated by the arrow 434. Thereafter the microcomputer 460 disables the comparator 432 by signal over the line 336 thus enabling the peak detector comparator 414. More specifically the change in the output state of the comparator 432 allows the comparator 414 to function normally as a peak detector. So long as the positive input of the comparator 414 is greater than its inverting terminal input, the comparator 414 is in an open collector state allowing current to flow through the resistor 419, the diode 420 and the resistor 422 to charge the capacitor 424. Thus, at the end of a sample time the voltage across the capacitor 424 represents the positive peak value of the signal at the positive input of the comparator 414.

With reference to FIG. 6, a block diagram of the microcomputer-controlled control logic network 26 is shown. The control logic network 26 includes a microcomputer 460, such as a microcomputer chip manufactured by Intel Corporation and sold under model number 8039. Timing for the microcomputer 460 is derived from a suitable crystal 462, typically with a resonant frequency of six megaHertz. The microcomputer 460 communicates over an eight bit data bus 464 with an address latch 466 and with a program memory 468. Program addresses from the latch 466 are applied to the memory 468 over an eight bit address bus 470.

The output bus 350 from each analog-to-digital converter 338 used in the system is connected to the address bus 464 of the microcomputer 460. Control signals to each of the converters 338 on the conductors 348 are derived from a converter control network 472 which includes a read controller logic 474 and a divide-by-two circuit 476 to provide the converter 338 clock signal. Inputs to the read controller logic 474 are derived from one address bit carried from the address latch 466 on a line 478 and from the microcomputer 460 on a line 480. The divider circuit 476 is driven by a clock signal on a line 482 from the microcomputer 460. Converters 338A and 338B (in a two-channel system) are read one at a time by a signal from the read controller logic 474 over the control lines 348A or 348B, respectively. A CONVERT COMPLETE signal is sent to the microcomputer 460 by one (and thus the other) of the converters 338 on the line 461.

Figure 8:
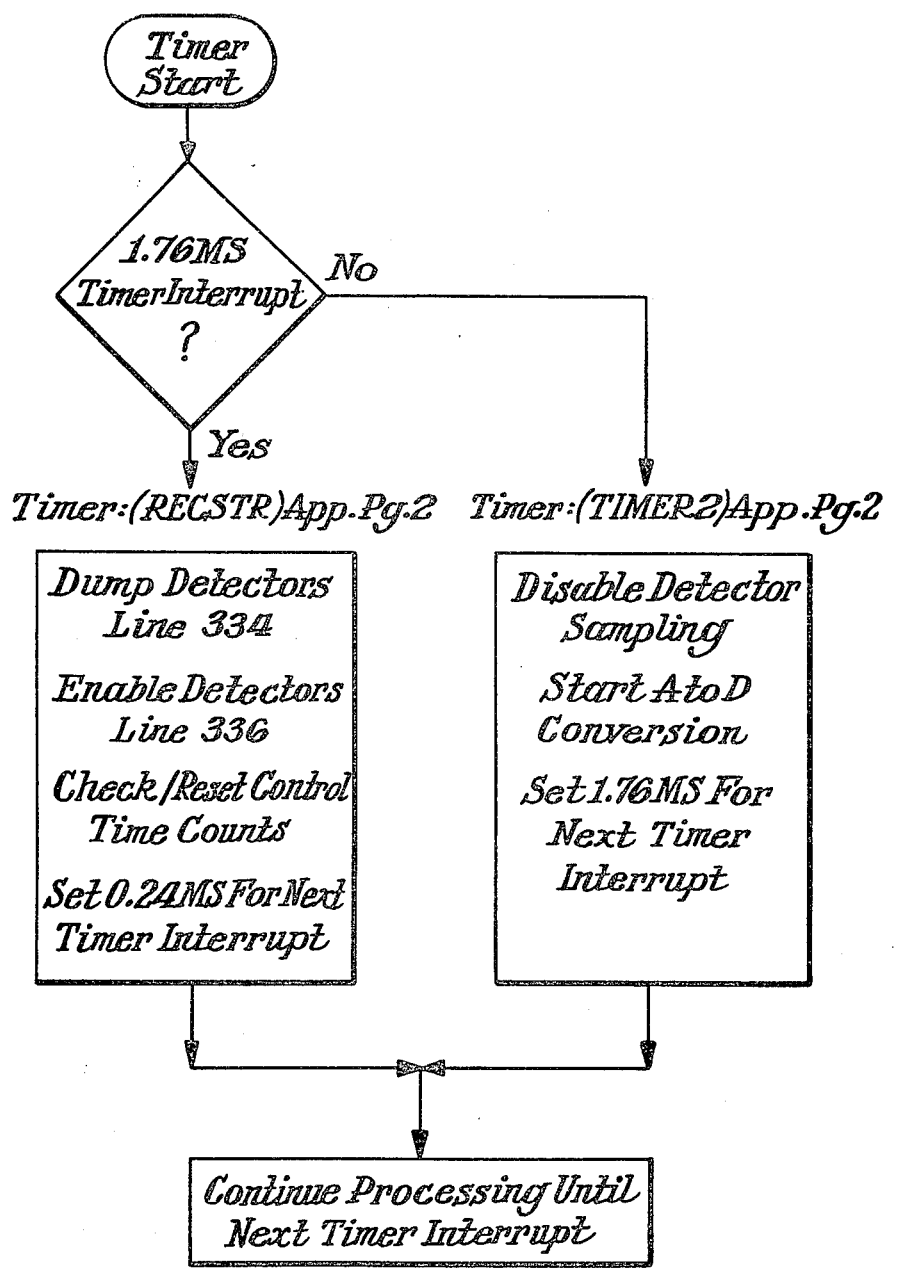
FIGS. 8 through 11 are flow diagrams of the program used in connection with the microcomputer-controlled signal processor of the invention.

Information regarding the status of the machine tool is applied to the microcomputer 460 over the conductors 366 input at port P1. Control signals to the receiver on the lines 334 and 336 emanate from port P2 of the microcomputer controller 460. Signals to the machine interface 28 (FIG. 8) from the microcomputer 460 are carried by a bus 488 to an input/output expander 490, such as that sold by Intel under model number 8243. The expander 490 communicates with a driver 492, as a device sold by Sprague under model number ULN 2803, which in turn communicates with the machine interface over the conductors 368. Outputs from the control logic 26 include the MACHINE ENABLE and MACHINE OVERRIDE indicators.

The operating mode for the machine tool safety system is selected by an operator through the mode select switch 494. The four available operating modes include: processing of signals from transmitter channel A only; processing of signals from transmitter channel B only; processing of signals from transmitter channels A or B (e.g., valid when controlling an elastomer mill); and processing of signals from transmitter channels A and B (e.g., valid when controlling a pipe flanging machine). The microcomputer 460 may be reset, as when entering a mode change or restarting the program after a self-test failure, through a reset line 495.

The operation of the microcomputer-controlled receiver and control logic shown in the Figures may be explained in connection with the timing and register sequences diagrams shown in FIGS. 7A through 7E and with the flow charts shown in FIGS. 8 through 11.

The signal output from the electric field generator is basically an interrupted continuous carrier wave modulated in accordance with a predetermined modulation characteristic to exhibit a predetermined recurrence rate and duty cycle. In practice, a modulation characteristic using a seventy Hertz recurrence rate and fifty percent duty cycle is preferred. This signal for each channel is linearly processed, filtered and detected by the receiver 24 using the configuration of elements shown in FIGS. 4 and 5 and operating under the control of the microcomputer 460. After conditioning the induced signal detected by a given channel typically appears as shown in FIG. 7B. The processing of the information contained in the signal received by the receiver 24 is performed by the signal processor 23 operating under the control of the microcomputer 460. The essential steps in signal processing include: (1) synchronizing the processor with the transmitted signal; (2) determining whether a "lock" exists, that is, whether the received signal exhibits the appropriate modulation characteristic; (3) signal level averaging to determine the amplitude of the received signal; and (4) determining the existence of ARM and SAFETY LEVEL conditions.

As a general overview of these processes, reference is invited to FIGS. 7B through 7D. The detected signal for a given channel (FIG. 7B) is sampled during predetermined sample intervals (FIG. 7C). If the modulation characteristic utilizes the preferred recurrence rate of seventy Hertz (period of fourteen milliseconds) there are on the average seven, two-millisecond sample intervals during each fourteen millisecond period (FIGS. 7B and 7C). During each sample interval the detected signal is logarithmically averaged and quantized by the processor by assigning a digital bit (usually a binary 1) if the amplitude of the sampled signal is greater than a running average. The historical results of the quantization for the detected signal during each sample interval are stored in a first register (DATAX register). A second register, the SYNCX register, is also maintained for each channel. Synchronization occurs (and an indication thereof is stored in the SYNCX register) only if a predetermined pattern of bits is developed and stored in the DATAX register. A "lock" may be generated only if the appropriate bit pattern is stored in the DATAX register at the end of the last sample interval and if synchronization has occurred after a minimum of twenty-four pulse repetition intervals. Once "lock" is achieved, the average peak intensity is calculated. This average is maintained in a suitable PKAVGX register and is used to determine whether the ARM condition has been met. Once the ARM condition is met, the SAFETY LEVEL condition is flagged should two successive signal samples exceed the preset SAFETY LEVEL threshold. A complete listing (in assembly language for the Intel Corporation 8039 microcomputer) of the program used by the microcomputer to effect the flow diagram is attached to and made part of this application.

The sequence of activities occurring during each sample interval is shown in FIG. 7D. The sample intervals are asynchronous to the incoming signal to which synchronization and quantization is required. The two millisecond sample interval is subdivided into two subintervals of 0.24 milliseconds and 1.76 milliseconds, respectively. During the first subinterval (FIG. 8) each of the detectors 384, 386, 388 and 390 are cleared by asserting a DETECTOR DUMP signal on the line 334 (FIG. 5) to drain the charge on the capacitor 424 disposed in each peak detector stage. Thereafter, the detector circuitry is enabled by asserting an ENABLE signal on the lines 336 to the detectors (FIG. 5). (References to the Appendix are indicated in the flow diagrams by the term "APP. PG.    ").

As seen from FIG. 7D, during the second subinterval the sample measurements as affected by the detectors are disabled by terminating the ENABLE signal on the lines 336. Thereafter, the analog-to-digital conversion of the output of each detector is requested by the microcomputer 460, starting from highest order detector (the detector 390) and proceeding toward the front of the receiver 24. The converted value is sent to the microcomputer 460 on the bus 350 and stored in a suitable register, thus quantizing the received signal to a resolution of plus or minus 0.5 dB. The output of the highest-ordered detector in the chain that is not saturated is retained and converted to a logarithmic value lying within the segment of the receiver's zero to eighty-two dB response range allocated to that detector.

Figure 9:
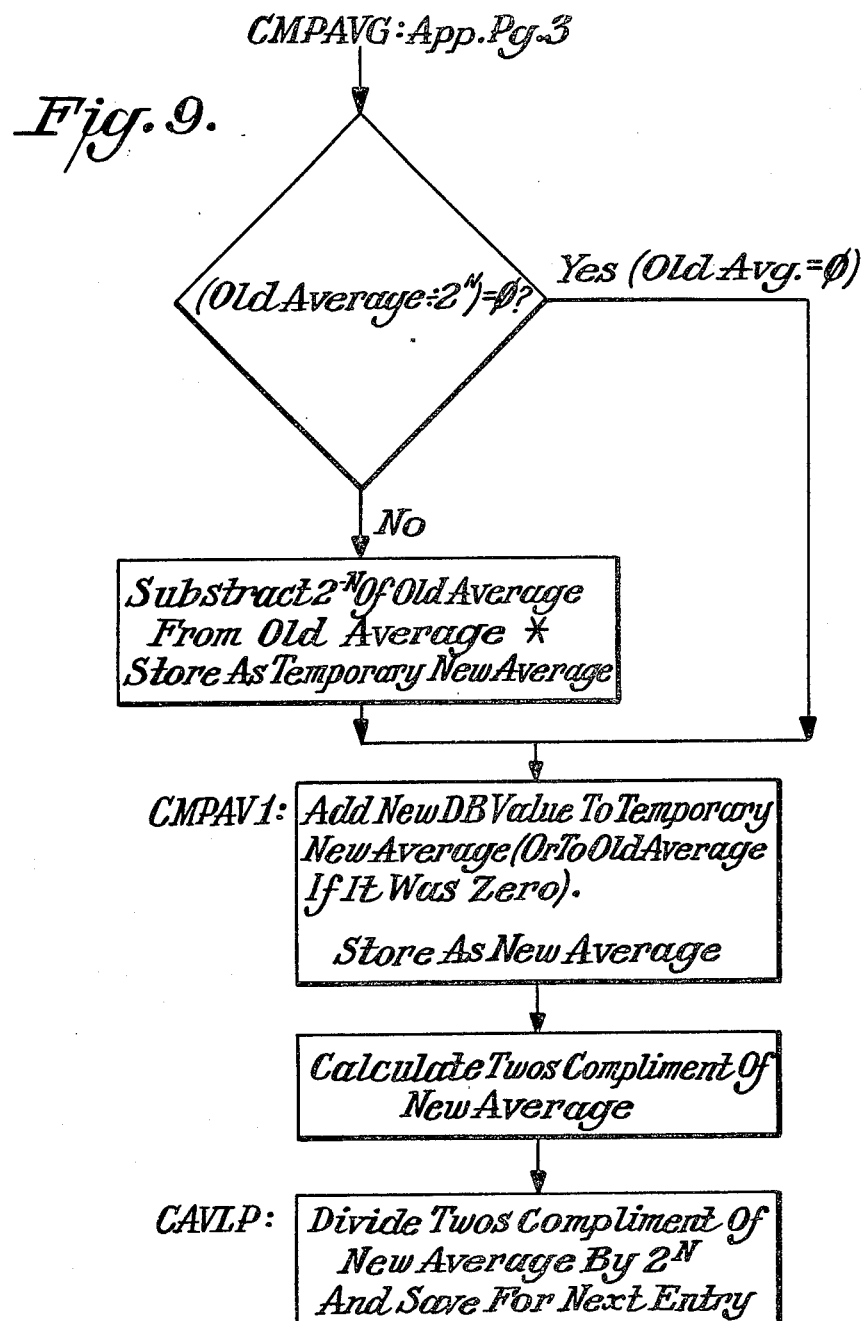

Once the detectors are polled, the running average of the received signal in decibels is computed and maintained as an exponential integration of successive samples to minimize storage requirements and processing time using the routine CMPAVG (FIG. 9). The running average is maintained in the upper two bytes of a three-byte storage register SIGAVX. The lower byte contains the two's-complement of the old running average divided by a number $2^N$, where N typically equals five. After each new sample is received and converted into decibel form, a new average value is calculated. The new average is the sum of the new sample value plus the product of the old average and a number $(1-2^{-N})$. This technique provides integration on an exponential curve similar to that obtained by integrating voltage in a resistor-capacitor electrical network. The equivalent time constant is determined by a specified value N contained in a data register GENCNT. When the CMPAVG subroutine (FIG. 9) is called, the time constant is the product of the sampling interval multiplied by 2 raised to the power N of the number in the GENCNT register. For computing the received signal average, the number five is stored in the GENCNT register, and the time constant is sixty-four milliseconds.

The decision process which determines whether the receiver is synchronized and locked with the recurrence rate of the pulse-modulated signal received from the transmitter is based on the relative timing between each two millisecond sample interval and the recurrence of each pulse leading edge and duration.

No decisions are made affecting safety on a single sample. The purpose of the LKSYNC routine is to determine that synchronization has been established with the incoming modulation signal as indicated by the count in the register LKCNTX. The register LKCNTX is incremented only if three criteria are met: (1) the bit pattern in the least significant bits of the DATAX register is a predetermined bit pattern ("0-0-1") and the SYNCX register is zero (BSYNC); (2) the first sample following the "0-0-1" bit pattern is a one (ONETS); and (3) the fourth sample following the "0-0-1" bit pattern is a zero (ZROTS). Failure of the second or third item will result in decrementing the LKCNTX register. Also the failure to receive another "0-0-1" bit pattern prior to the eighth sample following a valid "0-0-1" pattern will decrement the register LKCNTX.

Lock to the incoming modulation is declared by setting LKFLG when the count in the LKCNTX register exceeds a predetermined number (e.g., twenty-three). The minimum time to lock is a predetermined number (e.g., twenty-four) of periods of the incoming modulation (about 343 milliseconds in the implementation shown). Only after lock is achieved is the magnitude of the signal used to determine the arming indicator. This process is controlled in the ONETS routine by first computing a PKAVGX with an exponential average taken over sixteen samples (GENCNT equal four). When the PKAVGX exceeds the preset arming threshold the ARMFLG is set. With both ARMFLG and LKFLG set the unit is essentially enabled and the machine tool can be activated upon request. ONETS also controls the execution of the SAFTY routine by setting the microcomputer flag FO if the ARMFLG and LKFLG are set.

In the routine SAFTY the value of the latest sample is compared to the present value of the SAFTY level potentiometer. Two successive samples separated by one period of the modulation in time being greater than the preset level will cause the indiator SFTYFLG to be set. The indicator SFTYFLG will disable the machine tool even though the LKFLG and ARMFLG are both set. In the instance where the machine is being activated, the appearance of a SAFTY condition will generate an override function which will force the machine tool to a safe state.

The synchronization and lock decision processing is implemented using the two eight-bit data registers DATAX and SYNCX. The register DATAX is used to maintain a running record of the relative amplitude of the received signal at the sample intervals. The SYNCX register is used as a bit position counter and synchronization status register. With reference to the flow diagrams 10A through 10D, after a received signal is sampled and converted and the signal average computed using the CMPAVG subroutine (FIG. 9), the subroutine LKSYNC is entered (FIG. 10A), the system control flag FO is set to zero and the bit pattern in the DATAX register is shifted left one place. The lowest order bit in the DATAX register is set to a logic one state if the sample value is equal to or greater than the running average stored in the SIGAVX register, otherwise it is zero. The progressive filling of the DATAX register is shown in FIG. 7E for a typical detected signal (FIG. 7B). The occurrence of a "0-0-1" pattern in the three least significant bits of the DATAX register and the SYNCX register being zero are the criteria that determine whether synchronization with the incoming modulation signal zero-to-one transition has occurred.

Figure 10B:
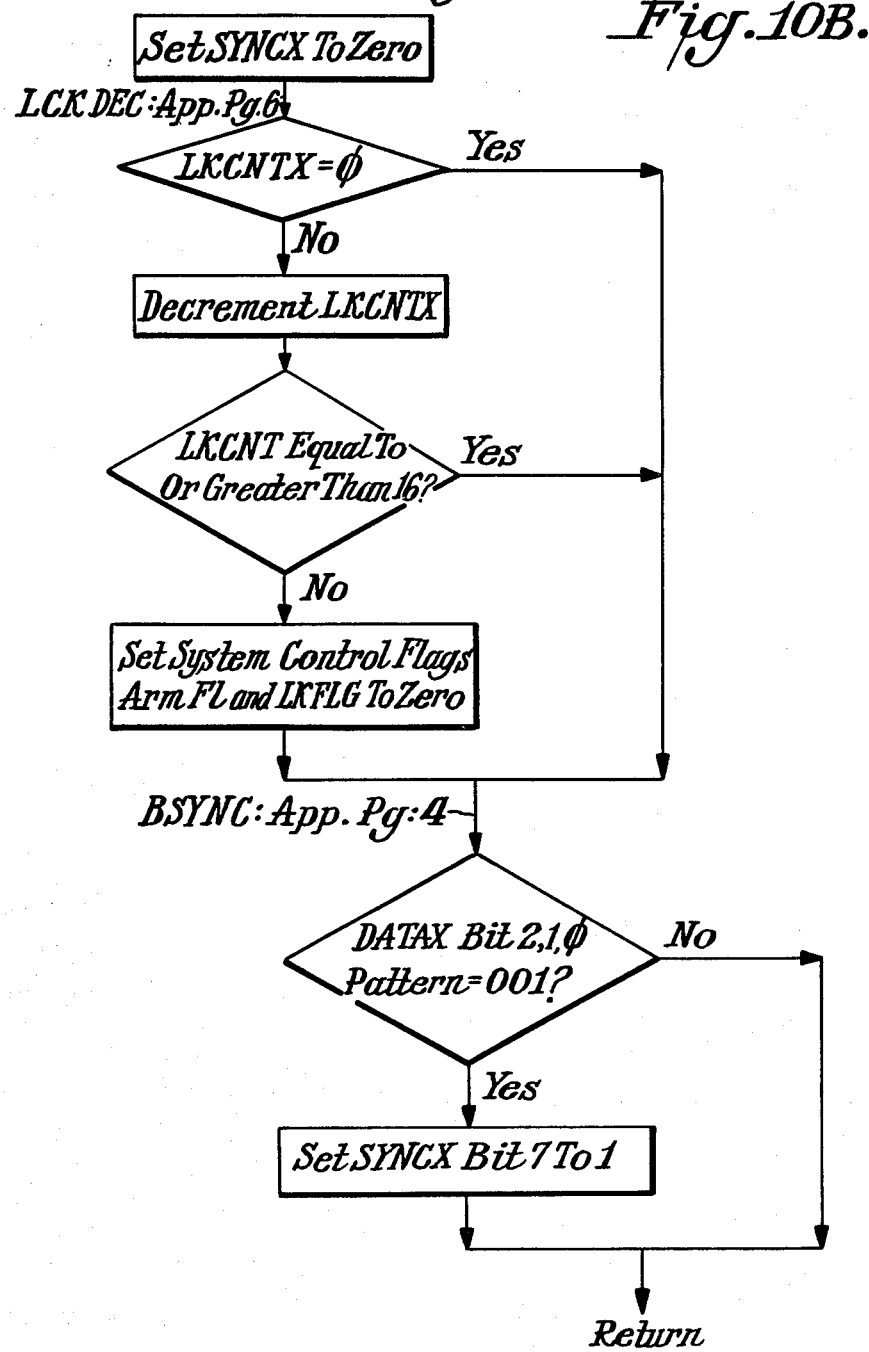

The SYNCX register is used to control processing once a valid "0-0-1" pattern (a pattern that appears while the SYNCX register is zero) in the DATAX register is found. The progressive shifting of the SYNCX register is also shown in FIG. 7E. When the SYNCX register is initally zero, execution is governed by the routine BSYNC (FIG. 10B). On branching from LKSYNC (FIG. 10A) to BSYNC (FIG. 10B) during the third sample interval, the low order bit pattern in the DATAX register is found to be "0-0-1". The most significant bit of the SYNCX register is set to one. When LKSYNC is reentered during the fourth sample interval the left rotation of the SYNCX register moves the logic one to the least significant bit position. Processing is then vectored based on the bit position of the one in the SYNCX register (FIG. 10A).

At the next entry to LKSYNC the ONETS routine (FIG. 10C) is executed to test the least significant bit of the DATAX register for a one. If a logic zero is found and not the expected logic one, the routine RESYNC (FIG. 10B) is entered. The count in a register LKCNTX is decremented (provided the count is greater than zero). If the count in the register LKCNTX is less than sixteen (an arbitrary value) the system flags LKFLG and ARMFLG are set to zero. However, if the least significant bit in the DATAX register should be a logic one, a peak signal average is computed by the subroutine CMPAVG (FIG. 9) in the same manner as for the running signal average except that a different value of GENCNT (equal to four) is used.

The routine ONETS also determines whether the safety system is armed. If the system control flag LKFLG is a logic zero (the system is not "locked" to the received signal, derived as discussed herein) the arm flag ARMFLG is set to a logic zero. When the system is synchronized and locked to the received signal and the computed peak average value is at least one-half dB above the predetermined arm value (as set by the value on the potentiometer 354, the flag ARMFLG is set to logic one. If the peak average falls more than 1.5 dB below the ARM threshold, ARMFLG is reset to zero.

The fifth and sixth sample intervals result in the successive shifting of the logic one from the least significant bit position to the BIT-2 position in the SYNCX register. The routine LKSYNC (FIG. 10A) branches to the routine BSYNC during each of these intervals because the SYNCX pattern is either not "1-0-0-0-0-0-0-0" or it is in a state which would select ONETS (FIG. 16C) or ZROTS (FIG. 16D) during these intervals.

Figure 10D:
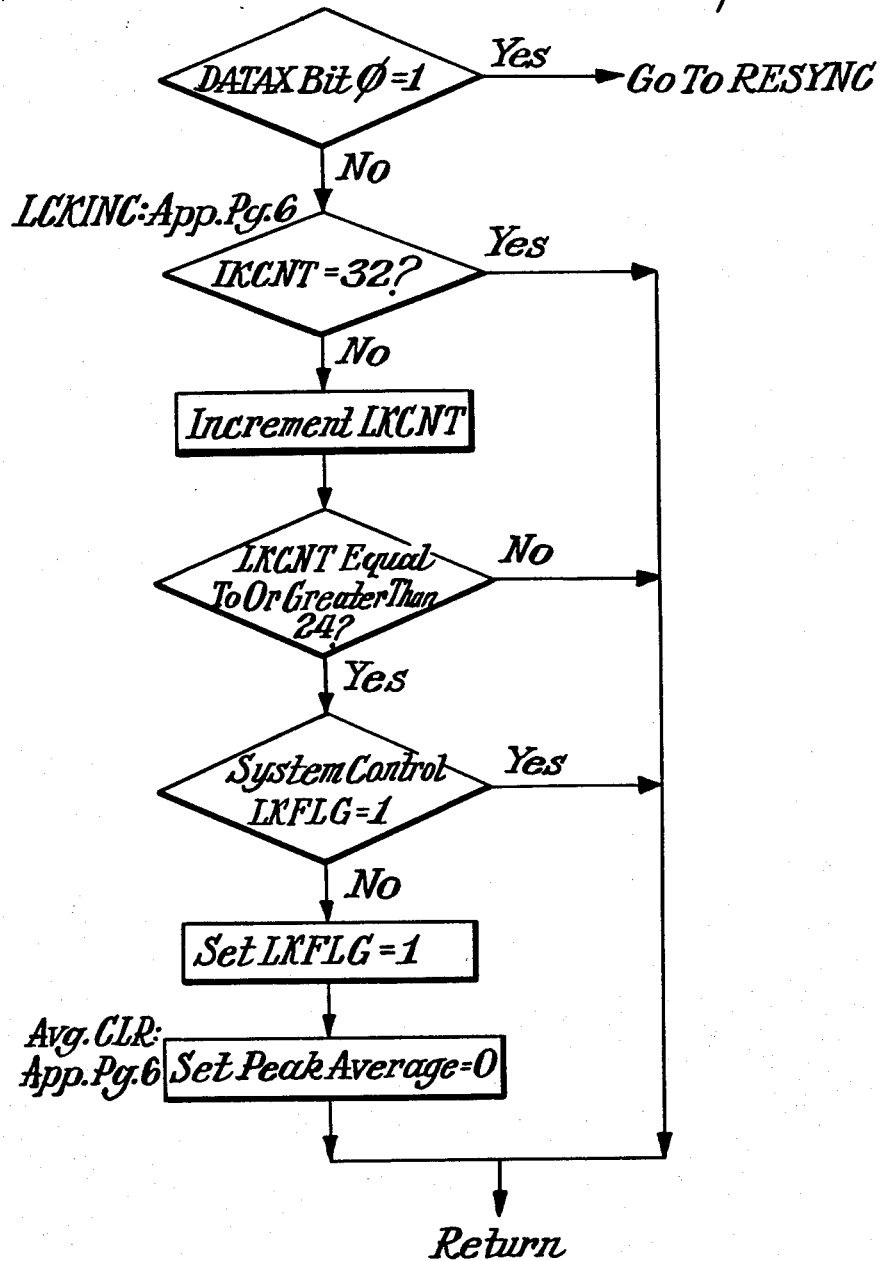

In the seventh sample interval, BIT-3 position of the SYNCX register becomes logic one and processing branches to the routine ZROTS (FIG. 10D). On entry to the routine ZROTS, the least significant bit of the DATAX register is tested. If this bit is not a logic zero, processing branches to the routine RESYNC (FIG. 10B) to decrement the count in the register LKCNTX and begin a search for a "0-0-1" synchronizing bit pattern in the DATAX register by setting the SYNCX register to zero. If the least significant bit is a logic zero, the count in the register LKCNTX is incremented (unless it has been previously incremented to its maximum value of thirty-two). It should be appreciated that LKCNTX can be incremented only once per modulation period if the received signal passes "0-0-1" bit pattern test, the ONETS and ZROTS. When these conditions have been met on successive modulation periods to allow LKCNTX to be incremented to at least twenty-four, the flag LKFLG is set to one. The system is then declared locked. The peak average register is cleared and a new peak average started after "lock" is acquired to improve system noise immunity.

Figure 11:
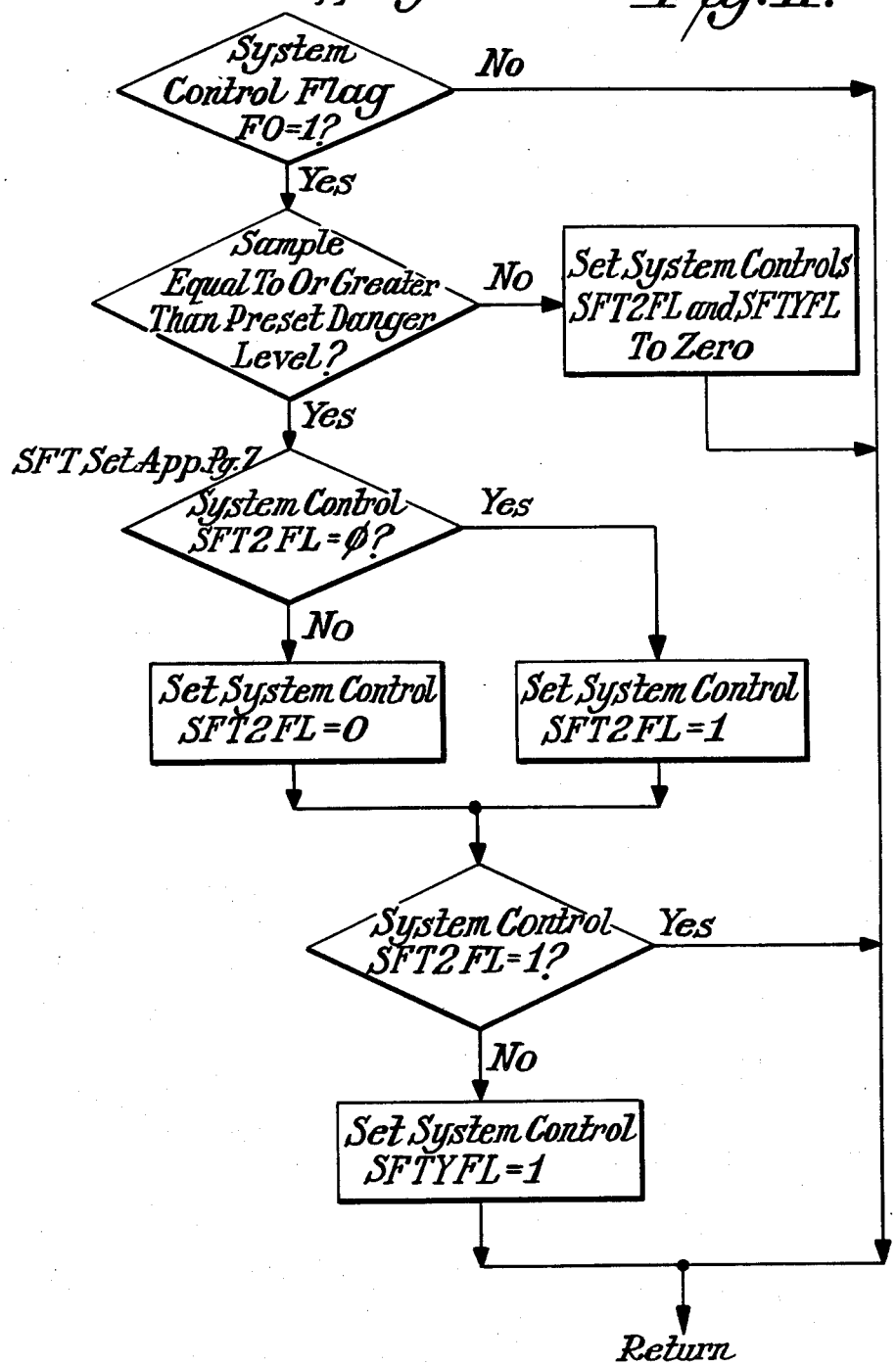

The SAFETY LEVEL condition is tested on each RETURN to the main program from the subroutine LKSYNC and specifically via the SAFETY subroutine. The SAFETY subroutine is shown in FIG. 11. This subroutine is executed only if the system control flag FO has been set to logic one by the routine ONETS (FIG. 10C). Recall that the flag FO is set to logic one only after ARMFLG indicator is set to logic one and ONETS is satisfied meaning that is the peak of the incoming modulation waveform. Should the flag FO be set and the peak average of the received signal be less than the threshold set by the potentiometer 352 safety control flag indicator SFTYFLG is set to logic zero. On the other hand, if two successive samples of the received signal, one period apart, are greater than or equal to the value set by the potentiometer 352, then SFTYFLG is set to logic one.

Those skilled in the art, having the benefit of the teachings hereinabove set forth may effect numerous modifications thereto. These modifications are to be construed as lying within the contemplation of the instant invention as defined in the appended claims.

What is claimed is:

1. A machine tool safety system comprising
an electric field generator for generating an electric field having a predetermined recurrence rate;
a capacitive receptor antenna cooperable with the electric field generator to form a capacitive coupled transmission arrangement operative to induce in the capacitive antenna a signal having a corresponding recurrence rate;
a receiver for detecting the induced signal, the receiver comprising:
a network responsive to a first command for asynchronously sampling the induced signal a predetermined number of sample times during each period of the induced signal;
an analog-to-digital converter connected to the sampling network for quantizing the magnitude of the sampled signal at each sample time; and
a network responsive to a second command to remove the sampled signal value from the sampling network prior to the occurrence of the next sample time.

2. A machine tool safety system comprising
an electric field generator for generating an electric field having a predetermined recurrence rate;
a capacitive receptor antenna cooperable with the electric field generator to form a capacitive coupled transmission arrangement operative to induce in the capacitive antenna a signal having a corresponding recurrence rate;
a receiver for detecting the induced signal, the receiver comprising
a plurality of serally connected amplifier stages each of which includes a linear limiting amplifier with fast recovery;
a sampling network connected to the output of each amplifier stage for asynchronously sampling, in response to a first command, the signal at the output of each amplifier stage;
an analog-to-digital converter connected to each sampling network for quantizing the signal level of the first of the amplifier stages not saturated; and,
a network associated with each amplifier stage and responsive to a second command to remove the sampled signal value from its associated amplifier stage prior to the occurrence of the next sample time.

* * * * *